H. G. CHILD.
BINDER.
APPLICATION FILED JAN. 3, 1917.

1,267,630.

Patented May 28, 1918.

INVENTOR
Hal G. Child
BY
L. L. Westfall
ATTORNEY

UNITED STATES PATENT OFFICE.

HAL G. CHILD, OF SPOKANE, WASHINGTON, ASSIGNOR TO CHILD AND WALTON COMPANY, OF SPOKANE, WASHINGTON, A CORPORATION.

BINDER.

1,267,630.   Specification of Letters Patent.   Patented May 28, 1918.

Application filed January 3, 1917. Serial No. 140,351.

*To all whom it may concern:*

Be it known that I, HAL G. CHILD, a citizen of the United States of America, residing at Spokane, in the county of Spokane and State of Washington, have invented certain new and useful Improvements in Binders, of which the following is a specification.

This invention pertains to binders and has for its object to provide a device for binding catalogues, pamphlets and the like in the form of a bound book for convenience, protection, neatness of appearance and for practical purposes.

The device will be hereinafter particularly described and illustrated in the accompanying drawings, in which—

Figure 1:
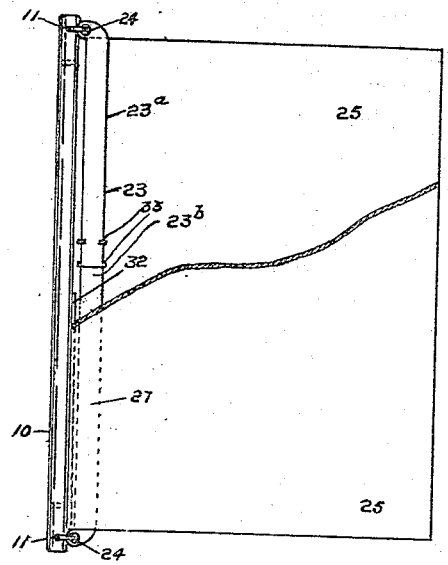
Figure 2:
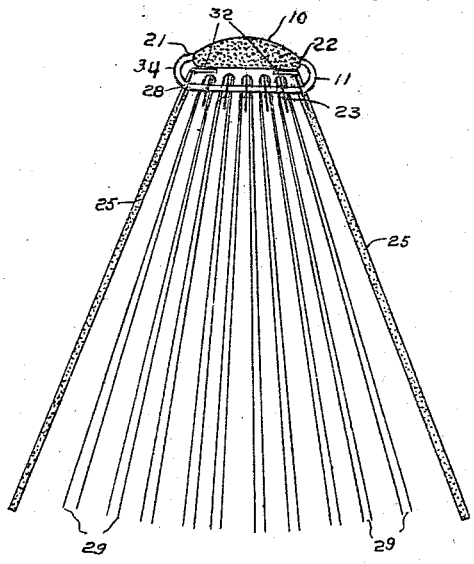
Figure 3:
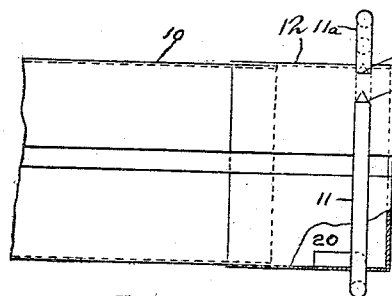
Figure 4:
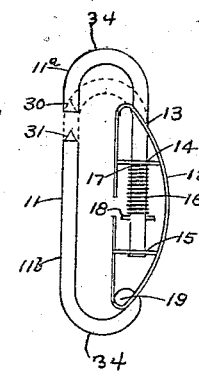
Figure 5:
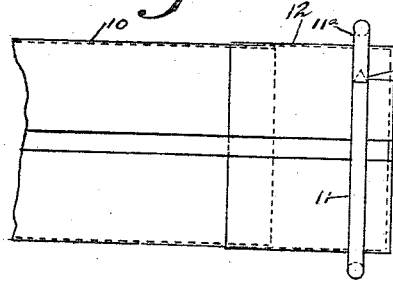
Figure 6:
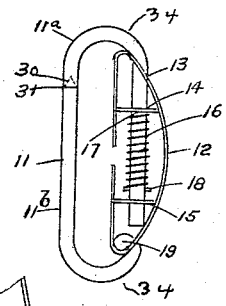
Figure 7:
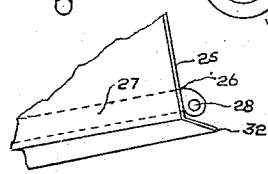

Figure 1, is a top view of the device with a portion of the top cover cut away,

Fig. 2, is an end view of the same with the covers spread and having placed therein folded inserts in the form of catalogues, pamphlets and the like, Fig. 3, is a broken-away view of a back used in the construction, showing an open link used in connection therewith, Fig. 4, is a side view of the open link detached showing the construction whereby the link may be opened and closed, Fig. 5, is a view similar to Fig. 3 with, however, the link shown as closed, Fig. 6, is a view similar to Fig. 4 with, however, the link shown as closed, and Fig. 7, is a perspective view of a broken-away portion of one of the covers of the device.

In a detail description of the device, a back 10 has provided at each end a detachable cap portion or cage 12 to which is attached a link 11 adapted to be manually opened and closed, an open position thereof being shown in Figs. 3 and 4 and a closed position thereof being shown in Figs. 5 and 6. The link 11 is composed of two parts $11^a$ and $11^b$ each of which is engaged by a cage 12, the part $11^a$ being slidably mounted through openings 13, 14 and 15 and having encircling the same a coil spring 16, between the bar 17 and the pin 18. The part $11^b$ is engaged by the cage 12 as at 19. The detachable caps or cages 12 of the back 10 have cavities 20 in which the greater portion of the link construction is contained, the visible portions being shown in Figs. 3 and 5 and which protrude through openings in the back as at 21 and 22, Fig. 2. In Fig. 6 is shown the normal position of the links 11, the same being closed. On these links 11 are mounted the bars 23, Fig. 1, by means of the eyes 24 through which the links pass. Also to these links are secured the covers 25 by means of bars 26 securely fastened between the folds of the covers, as at 27, and reaching outwardly beyond the ends thereof and being provided with eyes 28 therein through which the links 11 are passed. The link portion $11^a$ is provided with a concave end 30 and the link portion $11^b$ is provided with a convex end 31.

When it is desired to mount the rods 23 and the covers 25, or either of them, on the links 11, the links 11 are manually opened by pulling outwardly on the portion $11^a$ and turning the same sidewise, when the rods and covers are threaded onto the portion $11^b$. When the links 11 are open as shown in Fig. 4 the spring 16 is compressed as shown and when the portion $11^a$ is turned again with the concave end 30 directly above the convex end 31 and released the spring will expand and automatically close together the parts 30 and 31 of the portions $11^a$ and $11^b$ whereby the link is locked in a closed position.

In the application of the device for binding catalogues, pamphlets and the like, a bar 23 is inserted between the leaves of each document 29 at the rear or bound end or fold thereof, when the bars 23 will be secured to the links 11 as described making an assembly as illustrated in Fig. 2. In order to prevent the documents 29 from slipping rearwardly toward the back 10 or possibly beyond the edges of the same, a flange 32 extends at approximately right angles to the covers 25 of the device inwardly from the rear margin of the covers serving as a rear support for the documents 29.

The backs 10 may be composed of the parts 10 and caps 12 and fastened together as shown in Figs. 3 and 5, or otherwise detachably connected so that the portion 10 may be kept in stock and cut to different desired lengths, or the two parts may be made integral. Likewise the bars 23 may be made integral or in two parts 23ᵃ and 23ᵇ put together by a slidable connection as is shown at 33 Fig. 1, so that the two parts may be expanded or contracted to suit the length of back 10 desired.

The links 11 have curved or rounding ends 34 which coöperating with the eyes 28, cover 25 and flange 32 comprise a construction whereby the binder with its inclosures can be opened flat, after the same manner as an ordinary bound book.

What is claimed is,

1. A binder for catalogues, pamphlets and the like, comprising a back adapted to be placed adjacent the back of the catalogues, pamphlets and the like, means detachably connected at both ends with said back, adapted to extend between the leaves of the catalogues, pamphlets and the like and to hold the same adjacent said back, separate covers detachably connected with said back and adapted to inclose said catalogues, pamphlets and the like and a flange on each of said covers at the rear edge thereof adapted to extend inwardly between the catalogues, pamphlets and the like and said back.

2. A binder for catalogues, pamphlets and the like, comprising a rigid back with caps at the ends thereof and adapted to be placed adjacent the back of the catalogues, pamphlets and the like, extendible anchor rods adapted to be placed between the leaves of the catalogues, pamphlets and the like, and means at each end of said back detachably connecting said anchor rods to said back.

3. A binder for catalogues, pamphlets and the like, comprising a rigid back adapted to be placed adjacent the back of the catalogues, pamphlets and the like, anchor rods adapted to be placed between the leaves of the catalogues, pamphlets and the like, links having rounding ends, detachable caps at the ends of said back to which said links are secured and means of connection between said anchor rods and links.

4. A temporary binder comprising a rigid back, a link at each end of said back, anchor rods, paralleling said back, detachably and slidably connected with said links, combined with a removable cover composed of two parts each having an inwardly extending flange at the rear edge thereof, said flanges being adapted to meet or overlap each other.

5. A temporary binder comprising a rigid back, a link at each end of said back, said links being each composed of two parts, means for locking the two parts together, anchor rods paralleling said back detachably and slidably connected with said links and a removable cover connected with said links.

In testimony whereof I have affixed my signature in presence of two witnesses.

HAL G. CHILD.

Witnesses:
 H. M. WILEY,
 L. L. WESTFALL.

Copies of this patent may be obtained for five cents each, by addressing the "Commissioner of Patents, Washington, D. C."